Sept. 2, 1969  J. R. LAND ETAL  3,464,885
METHODS FOR EFFECTING CONTINUOUS SUBTERRANEAN REACTIONS
Filed April 5, 1966  2 Sheets-Sheet 1

INVENTORS
JOHN R. LAND
PAUL A. MOORE

BY Burns, Doane, Benedict,
Swecker & Mathis
ATTORNEYS

INVENTORS
JOHN R. LAND
PAUL A. MOORE

BY Burns, Doane, Benedict,
Swecker & Mathis

ATTORNEYS

United States Patent Office
3,464,885
Patented Sept. 2, 1969

3,464,885
METHODS FOR EFFECTING CONTINUOUS SUBTERRANEAN REACTIONS
John R. Land and Paul A. Moore, Duncan, Okla., assignors to Halliburton Company, Duncan Okla., a corporation of Delaware
Filed Apr. 5, 1966, Ser. No. 540,339
Int. Cl. D21c 3/24
U.S. Cl. 162—17                                   10 Claims

ABSTRACT OF THE DISCLOSURE

A method of effecting subterranean reactions, and particularly the digestion of wood chips. The method involves the flowing of material through countercurrent coaxial flow paths within a well bore while flowing heated fluid coaxially of the material flow paths.

---

General background, objects and summary of invention

This invention relates to methods for effecting continuous subterranean reactions or treatments.

In particular it relates to the utilization of well bores to form elongate reaction chambers in the practicing of such chemical processes as the chemical treatment of wood chips to make cellulose fibers.

It has been previously suggested that a well bore may be utilized to perform processes such as the chemical treatment of wood chips. For example, Lawton et al. Patent 2,844,464 discloses an apparatus including an open-ended U-tube disposed within a well bore. A slurry of wood chips and a chemical liquor is circulated, under the influence of gravity, through this U-tube.

Open-ended U-tube installations such as this are structurally cumbersome and not adapted to operating flow rates necessary to constitute a commercial operation.

In addition, devices such as those shown in the Lawton et al. patent require external pressure balancing fluids within the well bore and do not effectively contain or utilize heat introduced into the well bore to facilitate a reaction.

Recognizing the necessity for eliminating operational drawbacks of systems of the type contemplated in the Lawton et al. patent, it is an object of the present invention to provide a method whereby a coaxial flow pattern is utilized in a well bore to improve the distribution and absorption of heat injected into a system.

It is a further object of the invention to provide such improved methods wherein coaxial flow patterns are provided so as to eliminate the necessity for external pressure balancing fluids within the system.

Yet another object of the invention is to provide such improved methods wherein the general location of an inflection point of pressure values within the system is generally aligned with the location of the inflection point of temperature values within the system.

It is also an object of the invention to provide coaxial flow patterns in conjunction with an open reservoir in the lower end of the well bore so as to provide a longitudinal treatment zone superimposed above a soaking reservoir.

Yet another object of the invention is to provide such improved methods wherein coaxial flow patterns are utilized to achieve maximized, lateral shielding of reaction zones so as to improve the overall safety of the system and minimize the likelihood of failure or breakdown.

It is a further and especially significant object of the invention to provide systems including multiple well reaction chambers whereby material flowing from the one well is subjected to a separating treatment prior to its being introduced into another well.

It is a particular object of the invention to provide such improved methods wherein coaxial flow systems within well bores are effectively employed in such treatments as the digestion of wood particles.

In accomplishing some of the foregoing objects, a method is utilized wherein material to be treated is flowed longitudinally in one direction through a well bore. This same material is also flowed through the well bore in a second direction opposite to the said one direction, with the material being constrained to define a generally annular flow encircling the flow in the said one direction. Heated fluid is flowed longitudinally of the well bore and radially between material flowing in the said one and second directions within the well bore.

In the context of the foregoing combination, additional advantages of the invention are derived wherein, between the flow of material in said one and second directions, the material is discharged into a reservoir defined by an open lower end of the well bore and wherein said one or first flow direction is downward and said second flow direction is upward within the well bore.

Even additional benefits are derived where the foregoing techniques are supplemented by supplying the heated fluid to one of the upper and lower ends of the downward flow of material whereby as the material flows downwardly into the well bore the pressure of the material progressively increases while the temperature progressively changes in one direction and, as the material flows upwardly through the well bore, the pressure of the material progressively decreases and the temperature of the material progressively varies in a direction opposite to the one direction.

Other advantages of the invention are derived wherein material to be treated is flowed through a coaxial flow pattern within the well bore and heated fluid is flowed longitudinally of the well bore both between the coaxial material flow paths and also externally of the two material flow paths.

Particular advantages of the invention are also derived by the employment of a method wherein material to be treated is flowed through a coaxial flow path in one well and heated while flowing through the one well, material leaving the one well is subjected to a phase separation treatment, and thereafter the material is flowed through a coaxial flow path in a second well and heated while flowing through the second well.

Substantial advantages of the invention are derived from the structural combinations of conduits and other apparatus which accomplish the various combinations of method steps previously described.

The overall invention is of prime consequence in providing a safe, reliable technique for effecting chemical reactions between diverse ingredients under high pressure and elevated temperature conditions.

Drawings

In describing the invention reference will be made to preferred embodiments shown in the appended drawings.

Detailed description of invention

Figure 1:
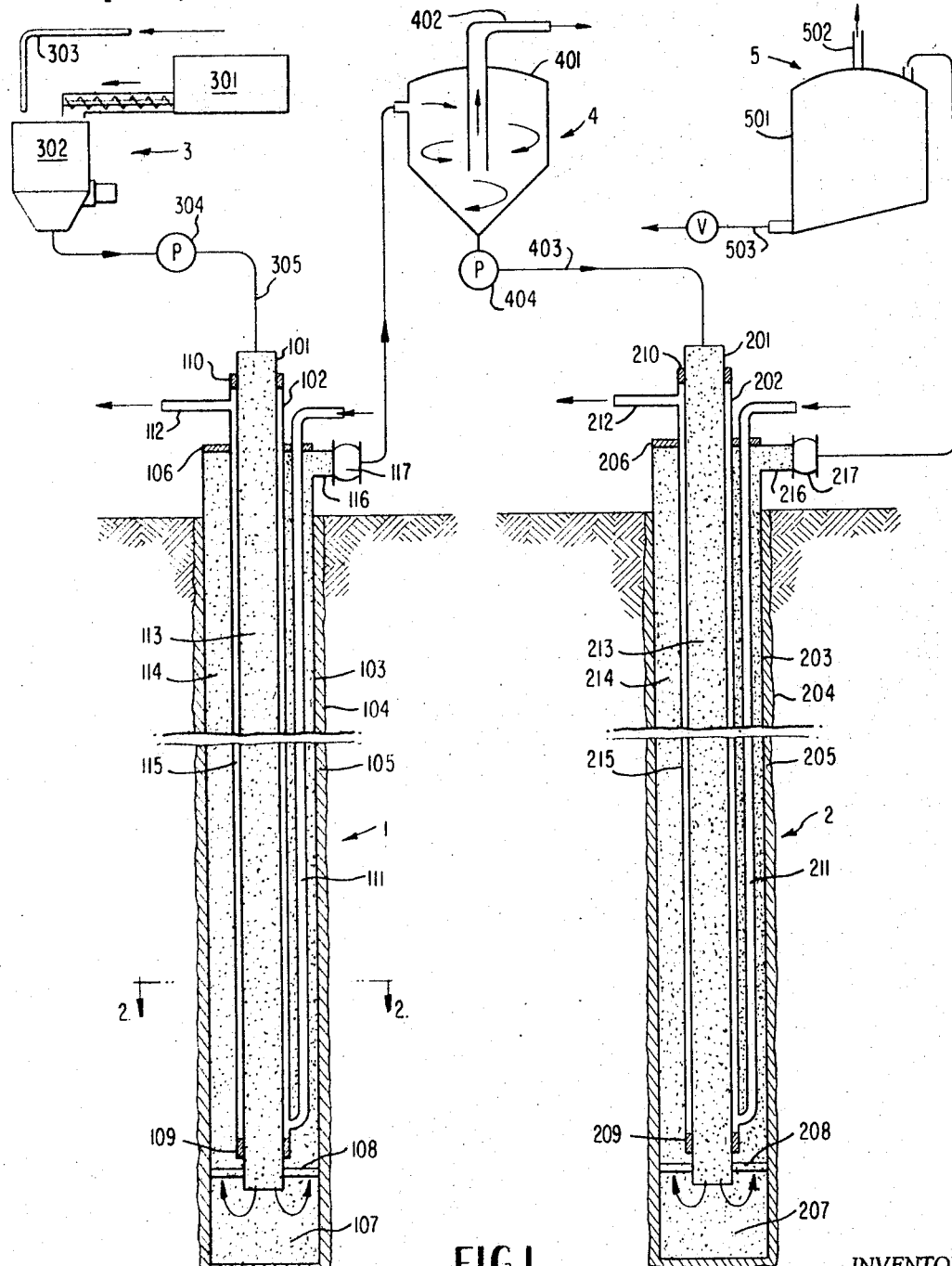
FIGURE 1 is a schematic, vertically sectioned, elevational view of a dual-well installation wherein material is coaxially flowed through two wells and subjected to a phase separation treatment while moving from one well to the other.
Figure 2:
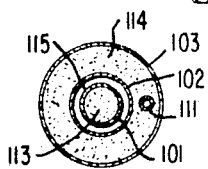
FIGURE 2 is a representative cross-section through a portion of one well of the FIGURE 1 system as viewed along the section line 2—2.

FIGURE 1 schematically illustrates a dual, well bore installation which may be effectively employed to effect substerranean chemical reactions such as the processing or digesting of wood chips.

The FIGURE 1 system or apparatus includes a first well unit 1 and a second well unit 2. First well unit 1 includes an innermost tubular conduit 101, an intermediate tubular conduit 102, and an outermost tubular conduit or casing 103.

Conduits 101, 102 and 103 may be assembled from conventional, threadably interconnected, metallic conduit sections of the type used in oil wells.

Preferably outermost conduit 103 is sealed to the adjacent subterranean formation wall 104 by a conventionally installed, cement lining or annular sealing layer 105.

Innermost conduit 101 is connected at its upper end to a well head 106. The lower end of conduit 101 terminates in an open lower end 107 of the well 1. Lower well end 107 provides reservoir means communicating with the interior of tubular conduits 101 and 103.

The lower end of tubular conduit 101 may be centralized or stabilized by conventional and schematically shown, well conduit centering means 108. As will be understood, centering means 108 is axially perforate so as to allow fluid flow longitudinally of the well and between conduits 103 and 101.

The upper and lower ends of conduit 102 are sealingly engaged with the outer periphery of conduit 101 through the utilization of conventional and schematically shown seal or packer means 109 and 110.

A relatively small diametered, tubular conduit 111 extends downwardly from the well head 106 to communicate with the lower end of the tubular conduit 102 above the seal means 109.

A branch conduit 112 at the well head 106 communicates with the interior of the upper end of the conduit 102 below the well head 110.

The longitudinal cavity 113 within the interior of conduit 101 comprises first, longitudinally extending passage means of the well 1 while the annular space 114 between the conduits 103 and 102 comprises second annular passage means encircling the first passage means 113 and extending longitudinally of the well unit 1.

The annular space 115 between conduits 102 and 101, which communicates with supply conduit 111 and branch conduit 112, may be considered as third annular passage means encircling the first passage means 113 and disposed radially between the first passage means 113 and the second passage means 114.

As will be appreciated first passage means 113 is defined by first conduit 101, the annular second passage means 114 is defined by the radially spaced third conduit means 103 and second conduit means 102, while the annular third passage means 103 is defined by the radially spaced second conduit means 102 and first conduit means 101.

A branch or discharge conduit 116 communicates with the interior of the upper end of the casing 103 at the well head 106. Branch conduit 116 may be provided with a flow regulating, back pressure creating device 117, such as a valve or orifice plate.

Second well unit 2 is identical to well unit 1. Thus, well unit 2 includes central tubular conduit 201, an intermediate tubular conduit 202, and an outer casing 203. Casing 203 is sealed to formation wall 204 by cement lining 205.

Well unit 2 includes a well head 206 and an open lower end or reservoir 207. Conduit 201 may be centered at its lower end by centering means 208. Seals 209 and 210 sealingly connect lower and upper ends respectively of conduit 202 with conduit 201.

Relatively small supply conduit 211 extends downwardly and longitudinally of the well between conduits 202 and 203 to communicate with the interior of the lower end of conduit 202. A branch conduit 212 extends from the interior of the upper end of conduit 202.

Well unit 2 includes centrally disposed, first passage means 213, outermost annular passage means 214, and intermediate annular passage means 215.

A branch conduit or material outlet 216 communicates with the upper end of the casing 203 at the well head 206. Discharge conduit 216 may be provided with flow regulating device 217 which may comprise a valve or orifice plate.

Diverse, chemically reactive constituents of material to be treated by the system are supplied from a supply means 3. Supply means 3, where wood chips are being digested, may comprise a screw type conveyor 301 for feeding wood chips in a regulated fashion, to a supply hopper or mixer 302. A conduit 303 extending from a source such as a metering pump may supply in a regulated or metering fashion a wood chip digesting re-agent conventionally termed a "chemical liquor," which may contain sodium hydroxide, and sodium sulfide.

Pump means 304, which may comprise a conventional rotary type slurry pump, serves to transport the mixture of liquor re-agent and wood chips through a supply conduit 305. This conduit 305 communicates with the upper end of first passage means 113 of the first well unit 1.

The material entering first passage means 1 flows downwardly through the passage 113 of well unit 1 and discharges into the reservoir 107. Material from the reservoir 107, under the pressurizing influence of the pump 304, flows upwardly in an annular pattern through second passage means 114.

Since the cross sectional area of the reservoir 107 exceeds the cross sectional area of the passage 113 or the passage 114, material will move within the reservoir 107 slower than it moves through the passage 113 and 114, i.e., the flow within the the reservoir 107 will be more quiescent and therefore more conducive to "soaking" type of reaction. The flow reversal within reservoir 107 will produce an admixing of the chips and liquor.

Material discharges from the upper end of the passage 114 through outlet 116, with the outlet flow being regulated by the device 117.

As will be appreciated, the combined pressurizing effect of the pump 304 and the outflow restricting effect of the device 117 will determine the rate and duration of flow of material through the well unit 1. In addition, the devices 304 and 117 will combine to produce a system pressure which will augment the hydro-static pressure of material within the passage 113 and 114.

Material flowing through the discharge conduit 116 is transported to a phase separating device 4. Phase separating device may comprise, as schematically shown, a conventional gas phase separator including a closed tank 401, a gas outlet 402, and a liquid outlet 403.

As material flows through the separator 4 the gaseous phase, generated by the chip digestion which took place in well unit 1, will leave the system through gas conduit 402 for appropriate recovery of disposal.

Slurry, i.e., re-agent and partially digested chips flowing through the discharge conduit 403 to the upper end of passage 201 of well unit 2, may be re-pressurized by a rotary, slurry pump 404. This material will then flow under the influence of pump 404 downwardly through passage 213 and discharge into the open reservoir 207 at the lower end of the well unit 2.

As in the case of well unit 1, material will flow in a relatively quiescent phase while in the reservoir 207 and thus be subjected to a "soaking" and mixing period.

Material will flow upwardly from the reservoir 207 through the annular passage 214 to the discharge conduit 216. Discharge conduit 216 may transport the material, which has by this time been treated to a two-step reaction cycle with an interspersed phase separation, to a treated material collecting station 5. Collecting station 5 may also comprise a gas separator including a housing 501 having a gas phase outlet 502 and a liquid-solid phase outlet 503.

In well unit 1 steam or other heated fluids may be supplied to the upper end conduit 111 from a source not shown. This heated fluid is carried to the lower end of the third passage means 115. The heated fluid then flows upwardly in an annular fashion through the passage 115 around the centrally down flowing material within the passage 113 and radially within the upwardly flowing material within the second passage means 114.

Thus, an annular heating zone is provided in the well unit 1 having maximum heating intensity at its lower end, generally coincidingly with the point of maximum pressurization of material within the well unit 1. In this connection it will be understood that the depth of the cavity 107 will ordinarily be quite short in relation to the length of the conduits 101, 102 and 103. Thus, the increase in material pressure which may occur axially within the reservoir 107 is quite small in relationship to the overall increase in pressure of material which occurs as it flows through the passage 113 and 114. With the heating passage 115 terminating generally adjacent the lower end of the passages 113 and 114, it may be considered that, from a practical standpoint, the point of pressure inflection within the well unit 1 generally concides with the point of temperature inflection. In other words, at the lower end of the well 1, the material in passages 113 and 114 will be subjected to maximum pressure and maximum temperature. In upper portions of the well unit 1 the pressure imposed upon the material in passages 113 and 114 will decrease as a result of the decreased hydrostatic head and the temperature of the heated fluid within the upper portions of passage 115 and also the heat absorbing material passages 113 and 114 will decrease as a result of prior heat loss to material within the passages 113 and 114.

The heated fluid will leave the well unit 1 through the discharge conduit 112 of the heating passage means 115.

Material flowing through the second well unit 2 is subjected to the same pattern of pressurization and heating as that which occurs in well unit 1. In this connection it will be understood that heated fluid, which may comprise steam, will be supplied to the upper end of the conduit 211 and that this heated fluid will leave the well unit 2 through the discharge conduit 212.

As will thus be appreciated, material is flowed through a heated coaxial flow path within the first well unit 1, thereafter subjected to a phase separation treatment, and finally flowed through another heated coaxial flow path within the second well unit 2.

Modified well system

Figure 4:
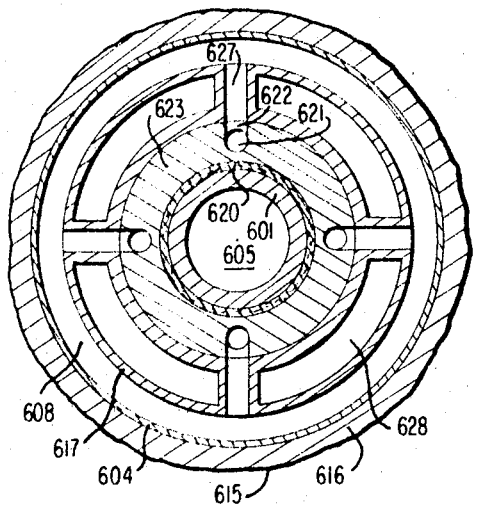
FIGURE 4 is a transverse cross-sectional view through a portion of the FIGURE 1 installation as viewed along the section line 4—4.
Figure 3:
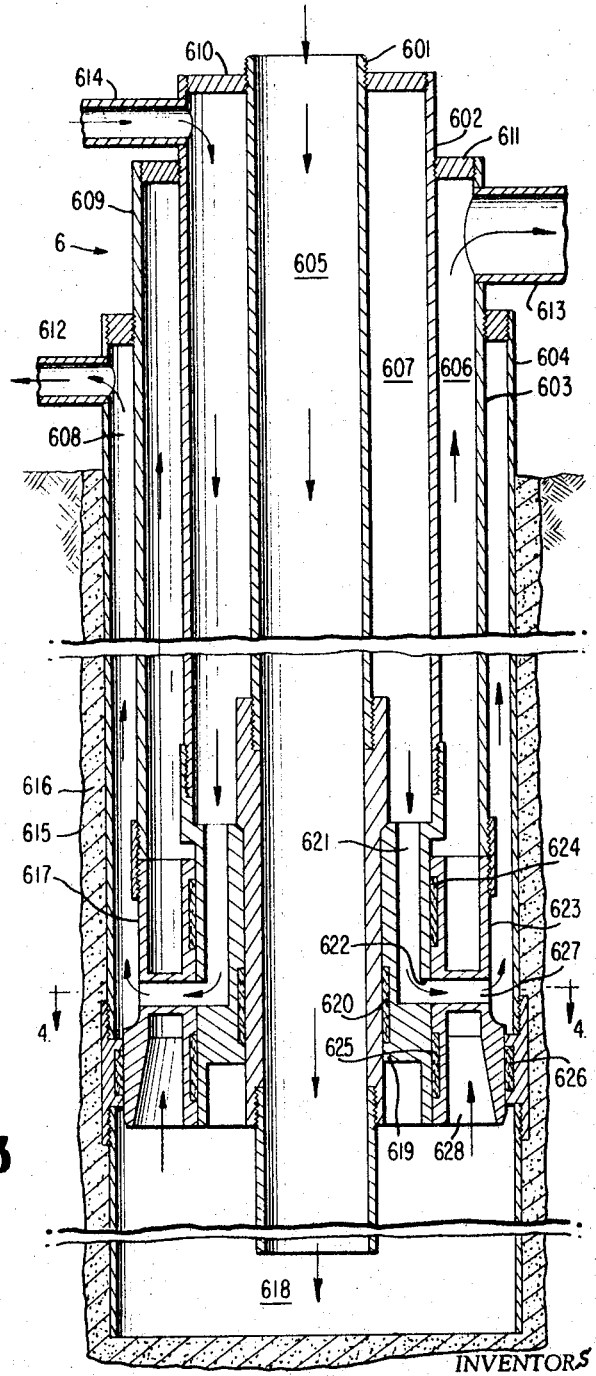
FIGURE 3 is a fragmentary, schematic, vertically sectioned, elevational view of a modified well bore installation providing for the coaxial flow of material to be treated in combination with a coaxial flow of heated fluid within a well bore.

FIGURES 3 and 4 schematically illustrate a midified, single well unit which provides for coaxial flow patterns of heated fluid radially interspersed with coaxial flow patterns of material to be reacted or treated.

This modified installation 6 comprises a first tubular conduit 601, a second tubular conduit 602 encircling conduit 601, a third tubular conduit 603 encircling conduit 602, and a fourth conduit 604 encircling conduit 603.

The interior of conduit 601 defines a first, centrally disposed passage 605. Conduits 602 and 603 are radially spaced to define a second, annular flow passage 606 coaxially encircling flow passage 605. Conduits 601 and 602 are radially spaced to define a third, annular flow passage 607 coaxial with, and encircling, passage 605 and disposed radially intermediate passages 605 and 606. Conduits 604 and 603 are radially spaced to define a fourth passage 608 coaxial with passage 605 and encircling passage 606.

A well head 609 includes an annular seal 610 which closes the upper end of passage 607 and another annular seal 611 which closes the upper end of passage 606.

A branch conduit 612 at well head 609 communicates with the interior of the upper end of passage 608. Another branch conduit 613 at well head 609 communicates with the interior of the upper end of passage 606. Still another branch conduit 614, at well head 609, communicates with the upper end of passage 607.

As shown schematically in FIGURE 3, outermost conduit 604 may be sealed to the well formation wall 615 by an annular cement layer 616 installed by conventional well cementing techniques.

In the lower portion of well unit 6, an assembly 617 is provided which provides fluid commuication between the lower ends of passages 605 and 606 and between the lower ends of passages 607 and 608. The assembly 617 is disposed above a reservoir-like, open lower end 618 of the well bore. This reservoir 618 serves to provide flow communication between the passages 605 and 606 with this communication being isolated or sealed from the communicating flow of fluid through the passages 607 and 608.

Assembly 617 includes a first, spider-like, annular unit 619 carried by the lower end of tubular conduit 602 and telescopingly and sealingly engaging the outer periphery of conduit 601. An annular gasket or seal 620 may be carried by the annular unit 619 to slideably and sealingly engage the outer periphery of conduit 601 as illustrated in FIGURE 3.

A plurality of first openings 621 extend longitudinally of unit 619 and communicate with the third passage means 607. A plurality of second openings 622 extend generally radially outwardly of the unit 619. Each opening 622 communicates with an opening 621.

Assembly 617 includes a second annular unit 623 carried on the lower end of conduit 603. Unit 623 slideably and sealingly engages conduit 604 and unit 619. In this connection, it will be understood that unit 619 may be considered an integral part of conduit 602. Schematically illustrated annular seals 624 and 625 provide slideable and sealing connection between the units 623 and 619, above and below the openings 622. A gasket 626 may be carried by the conduit 604 to provide slideable and sealing engagement between the conduit 604 and the unit 623.

A plurality of third openings 627 extend radially within and entirely through the unit 623. Each such opening 627 communicates with an opening 622 of the unit 619 and with the fourth passage means 608.

A plurality of fourth openings 628 are circumferentially interspersed with the openings 627 in the unit 623. Each opening 628 extends longitudinally of and communicates with the passage 606 and the reservoir 618.

As shown in FIGURE 4, longitudinal passages 628 of unit 623 may be arcuate in cross section, with their arcuate cross sectional curvature being coaxial with the central conduit 601.

In the FIGURE 3 installation, material to be treated, such as a mixture of wood chips and wood chip digestion liquor, is introduced into the top of the central conduit 601 under pump pressure. The material then travels downwardly through the passage 605 and discharges into the relatively quiescent or soaking reservoir 618. It will be understood that, as in the case of the well units shown in FIGURE 1, while material will flow relatively slowly within the reservoir 618 owing to its enlarged size, there will be an admixing of material owing to the change in flow direction which takes place within this soaking reservoir.

Material within the reservoir 618 will flow upwardly under the influence of pump pressure, through passage 606 and discharge through branch conduit 613.

Steam, or other heated fluid, may be introduced into the upper end of passage 607 through branch conduit 614. This heated fluid will move downwardly through the passage 607, pass through the communicating openings 621, 622, and 627, and then flow upwardly through the passage 608 and discharge through the branch conduit 612.

The FIGURE 3 installation differs from the FIGURE 1 installation in that the heat inflection point at the lower end of the well is a point of low supplied heat rather than maximum supplied heat. Thus, as material moves downwardly through the well unit shown in FIGURE 3, the hydro-static pressure imposed upon the material will progressively increase while the heat of fluid flowing through the passage 607 and radiating inwardly into the passage 605 and outwardly into the passage 606, will progressively decrease in a downward direction owing to heat transfer from the heated fluid to the material being treated. Obviously, an opposite pattern of heat progression occurs in the well units of the FIGURE 1 installation.

The material encircling flow of heated fluid rising upwardly into the passage 608 will tend to minimize heat transfer from the passages 605, 606, and 607 outwardly into the surrounding formation. In addition, this return flow will tend to minimize the temperature gradient extending longitudinally of the well.

As will thus be appreciated, the FIGURES 3 installation is characterized by improved heat retention and is particularly suited to effecting reactions where a more uniform application of heat is desired or where it may be desired to have applied heat progressively decrease as applied pressure progressively increases. In this connection it will be understood that the degree to which the flow of fluid in the passage 608 tends to minimize the temperature gradient will depend upon the heat content remaining within the heated fluid when it reaches the lower end of the passage 608.

Advantages

In describing the over all invention from an apparatus and method standpoint, its several advantages have been made apparent.

The coaxial flow pattern of material tends to provide a radial pressure balancing within well units.

The telescoping or moveable connections between conduits 601, unit 619, unit 623, and conduit 604 effectively accommodates for thermally induced, differential expansion of conduits 601, 602, 603 and 604.

The application of heat to material, radially intermediate coaxial material flow passages, tends to effectively retain heat within the system and minimize heat loss to surrounding formations. Depending upon flow directions, this applied heat will provide a general alignment of either high or low temperature points with the high pressure point of the system. In other words, systems are provided where the temperature inflection point is generally aligned with the pressure inflection point.

The utilization of a relatively quiescent soaking reservoir between coaxial flow paths is advantageous in that if affords material an opportunity to undergo soaking concurrent with admixing.

The multiple well unit treatment is significant in that multi-stage, chemical reactions may be performed in the safety of well bore environments, while phase separation is conveniently effected at well head or ground locations.

It is, of course, apparent that a prime advantage of the invention resides in effecting chemical reactions between diverse ingredients by effecting the controlled, pump induced flow of material through subterranean, coaxial flow paths which afford maximum safety and control.

We claim:

1. A method for effecting the subterranean treatment of material, said method comprising:
   flowing material to be treated longitudinally in a first direction through a well bore;
   flowing said material through said well bore in a second direction opposite to said first direction;
   flowing heated fluid longitudinally of said well bore and radially between said material flowing in said first and second directions within said well bore;
   said material, while flowing in one of said directions, being constrained to define a generally annular flow encircling the flow of said material in the other of said directions;
   causing said material to be treated to enter said well bore at a well head thereof; and
   substantially preventing a lateral flow of said material to be treated into said well bore from subterranean formations surrounding said well bore.

2. A method as described in claim 1 wherein said material comprises a plurality of diverse and mutually chemically reactive constituents.

3. A method for effecting the subterranean treatment of material, said method comprising:
   flowing material to be treated longitudinally in a first direction through a well bore;
   said material comprising a slurry of wood chips and a fluid, chip digesting reagent;
   flowing said material through said well bore in a second direction opposite to said first direction with said material being constrained to define a generally annular flow encircling the flow in said first direction of said material; and
   flowing heated fluid longitudinally of said well bore and radially between said material flowing in said first and second directions within said well bore.

4. A method for effecting the subterranean treatment of material, said method comprising:
   flowing material to be treated longitudinally in a first direction through a well bore;
   flowing said material through said well bore in a second direction opposite to said first direction with said material being constrained to define a generally annular flow encircling the flow in said first direction of said material; and
   flowing heated fluid longitudinally of said well bore and radially between said material flowing in said first and second directions within said well bore;
   said first flow direction being downward;
   said second flow direction being upward;
   said downward flow of material being discharged into a reservoir defined by an open lower end of said well bore and thereafter flowed upwardly through said well bore; and
   said heated fluid being supplied to one of the upper and lower ends of said downward flow of material whereby, as said material flows downwardly into said well bore, the pressure of said material progressively increases while the temperature progressively changes in one direction and, as said material flows upwardly through said well bore, the pressure of said material progressively decreases and the temperature of said material progressively varies in a direction opposite to said one direction.

5. A method for effecting the subterranean treatment of material, said method comprising:
   flowing material to be treated longitudinally in a first direction through a first well bore;
   flowing said material through said first well bore in a second direction opposite to said first direction with said material being constrained to define a generally annular flow encircling the flow in said first direction of said material;
   flowing heated fluid longitudinally of said first well bore and radially between said material flowing in said first and second directions within said first well bore;
   separating at least a portion of a phase of said material;
   flowing said material longitudinally in a first direction through a second well bore;
   flowing said material through said second well bore in a second direction opposite to said first direction with said material being constrained to define a generally annular flow encircling the flow in said first direction of said material;

flowing heated fluid longitudinally of said second well bore and radially between said material flowing in said first and second directions within said second well bore;

causing said material to be treated to enter said first well bore at a well head thereof; and substantially preventing a lateral flow of said material to be treated into said first well bore from subterranean formations adjacent thereto and a flow of said material into said second well bore from subterranean formations adjacent thereto.

6. A method for effecting the subterranean treatment of material, said method comprising:

flowing material to be treated longitudinally in a first direction through a well bore;

flowing said material through said well bore in a second direction opposite to said first direction;

flowing heated fluid longitudinally of said well bore with said fluid being constrained to encircle said flow of material in one of said directions and flow radially between said material flowing in said first and second directions within said well bore;

also flowing said heated fluid longitudinally of said well bore and encircling said material flowing in said other of said directions;

said material, while flowing in one of said directions, being constrained to define a generally annular flow encircling the flow of said material in the other of said directions;

causing said material to be treated to enter said well bore at a well head thereof; and substantially preventing a lateral flow of said material to be treated into said well bore from subterranean formations surrounding said well bore.

7. A method for effecting the subterranean treatment of material, said method comprising:

flowing material to be treated through a heated coaxial flow path within a first well bore;

subjecting said material flowing from said first well bore to a phase separation treatment;

subsequent to said phase separation treatment flowing said material, which has flowed through said first well bore, through a heated, coaxial flow path within a second well bore;

causing said material to be treated to enter said first well bore at a well head thereof; and substantially preventing a flow of said material to be treated between said first well bore and subterranean formations adjacent thereto and a flow of said material between said second well bore and subterranean formations adjacent thereto.

8. A method as described in claim 7 wherein said material comprises a plurality of diverse and mutually chemically reactive constituents.

9. A method for effecting the subterranean treatment of woody material, said method comprising:

flowing material comprising wood chips and a fluid, chip digesting reagent longitudinally in a first direction through a well bore;

flowing said material through said well bore in a second direction opposite to said first direction with said material being constrained to define a generally annular flow encircling the flow in said first direction of said material;

flowing heated fluid longitudinally of said well bore with said fluid being constrained to encircle said flow of material in said first direction and flow radially between said material flowing in said first and second directions within said well bore; and also flowing said heated fluid longitudinally of said well bore and encircling said material flowing in said second direction.

10. A method for effecting the subterranean treatment of woody material, said method comprising:

flowing material comprising wood chips and a fluid, chip digesting reagent through a heated, coaxial flow path within a first well bore;

subjecting said material flowing from said first well bore to a phase separation treatment;

subsequent to said phase separation treatment, flowing said material, which has flowed through said first well bore, through a heated, coaxial flow path within a second well bore.

References Cited

UNITED STATES PATENTS

| | | | |
|---|---|---|---|
| 1,012,777 | 12/1911 | Wigle | 166—61 |
| 2,421,528 | 6/1947 | Steffen | 166—61 |
| 3,242,989 | 3/1966 | Schlicht | 166—61 X |

HOWARD R. CAINE, Primary Examiner

U.S. Cl. X.R.

299—6; 166—61